(12) United States Patent
Dowty

(10) Patent No.: US 12,420,934 B2
(45) Date of Patent: Sep. 23, 2025

(54) PILOT SLEEPER SEAT WITH INTEGRATED RUDDER CONTROLS AND LOCKOUT FUNCTION

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 218 days.

(21) Appl. No.: 18/133,345

(22) Filed: Apr. 11, 2023

(65) Prior Publication Data

US 2024/0343396 A1  Oct. 17, 2024

(51) Int. Cl.
*B64D 11/06* (2006.01)
*B64C 13/04* (2006.01)

(52) U.S. Cl.
CPC ........ *B64D 11/0689* (2013.01); *B64C 13/044* (2018.01); *B64D 11/064* (2014.12); *B64D 11/0641* (2014.12); *B64D 11/0643* (2014.12)

(58) Field of Classification Search
CPC .............. B64D 11/0639; B64D 11/064; B64D 11/0641; B64D 11/0643; B64D 11/0689; B64D 11/0631; B64C 13/044
See application file for complete search history.

(56) References Cited

U.S. PATENT DOCUMENTS

| | | | |
|---|---|---|---|
| 2,585,688 A | | 2/1952 | Raymond |
| 3,826,434 A | * | 7/1974 | Von Beckh ........ B64D 11/0689 244/122 R |
| 4,484,722 A | * | 11/1984 | Larson .................... B64C 13/06 244/235 |
| 4,787,576 A | * | 11/1988 | McGrady ............... B64D 25/04 600/20 |

(Continued)

FOREIGN PATENT DOCUMENTS

| | | | |
|---|---|---|---|
| CN | 112441243 A | 3/2021 | |
| DE | 102020106033 A1 * | 9/2021 | ............. B60N 2/995 |

(Continued)

OTHER PUBLICATIONS

Federal Aviation Administration (FAA); "Flightcrew Member Rest Facilities"; Advisory Circular (AC) No. 117-1; Aug. 21, 2013. (Year: 2013).*

(Continued)

*Primary Examiner* — Amy R Weisberg
(74) *Attorney, Agent, or Firm* — Suiter Swantz IP

(57) ABSTRACT

A seat system for an aircraft including a pilot seat configured to operate in a piloting mode and in a rest mode. The pilot seat includes a dual function component configured to function as a flight controller when the pilot seat is operating in the piloting mode and a rest surface when the pilot seat is operating in the rest mode. The piloting mode and the rest mode are mutually exclusive operating modes. The seat system further includes a control system in electronic com- (Continued)

munication with the pilot seat and configured to activate the flight controller when the pilot seat is operating in the piloting mode, deactivate the flight controller when the pilot seat is operating in the rest mode. The pilots seats may be utilized in a two-pilot aircraft to provide provisions for pilot rest in an aircraft cockpit.

10 Claims, 7 Drawing Sheets

(56) References Cited

U.S. PATENT DOCUMENTS

| | | | |
|---|---|---|---|
| 4,848,708 A | | 7/1989 | Farrell et al. |
| 5,064,146 A | * | 11/1991 | Tung ................ B64D 11/0689 244/122 A |
| 11,167,838 B2 | | 11/2021 | Guering et al. |
| 11,535,373 B2 | | 12/2022 | Johnson |
| 2017/0166296 A1 | * | 6/2017 | Guering ................ G05G 1/36 |
| 2018/0290729 A1 | * | 10/2018 | Shavit ..................... B64C 13/18 |
| 2020/0183382 A1 | * | 6/2020 | Schwindt ................ G05D 1/46 |

FOREIGN PATENT DOCUMENTS

| | | | | |
|---|---|---|---|---|
| EP | 3786057 A1 | * | 3/2021 | ........... B60N 2/0272 |
| FR | 3010974 A1 | | 3/2015 | |
| WO | 2009016300 A2 | | 2/2009 | |
| WO | WO-2021079360 A1 | * | 4/2021 | ......... B64D 11/0601 |

OTHER PUBLICATIONS

Do Pilots Sleep in Flight?; Wayback Machine capture Mar. 17, 2023; FlightDeckFriend; <https://www.flightdeckfriend.com/ask-a-pilot/do-pilots-sleep-in-flight/>. (Year: 2023).*
European Patent Office, Extended European Search Report received in EP Application No. 24169051.0, Jul. 19, 2024, 7 pages.

* cited by examiner

PILOT SLEEPER SEAT WITH INTEGRATED RUDDER CONTROLS AND LOCKOUT FUNCTION

TECHNICAL FIELD AND BACKGROUND

The present disclosure relates generally to provisions for pilot rest in an aircraft cockpit, and more particularly, to a system including a pilot sleeper seat with integrated rudder controls configured to be disabled to function as seat comfort features such as recline, leg, and foot support.

The advent of aircraft capable of flying long distances and flight times raises the issue of pilot rest. In two-pilot cockpits, current pilot seats and the location of separate flight controls in the foot support area preclude in-flight resting in the pilot seats. While the pilot crew may be accommodated in the main cabin, segregated resting quarters complicate the cabin layout and reduce the space available for revenue service.

Accordingly, operational and equipment solutions are needed for pilot rest in the cockpit.

BRIEF SUMMARY

In one aspect, embodiments of the inventive concepts disclosed herein are directed to a system for pilot rest in an aircraft cockpit. In embodiments, the system includes at least one pilot seat configured to operate in a piloting mode or a rest mode. In embodiments, the pilot seat includes a dual function component configured to function as a flight controller when the pilot seat is operating in the piloting mode, and a rest surface or comfort feature when the pilot seat is operating in the rest mode. The piloting mode and the rest mode are mutually exclusive operating modes. The system further includes a controller in electronic communication with the pilot seat, the controller configured to activate the flight controller when the pilot seat is operating in the piloting mode, and deactivate the flight controller when the pilot seat is operating in the rest mode.

In some embodiments, the dual function component is position adjustable in each of the piloting mode and the rest mode, however, the degree is adjustability of the dual function component is greater when operating in the rest mode as compared to when operating in the piloting mode.

In some embodiments, the dual function component is an adjustable leg rest including integrated first and second rudder pedals each pivotally attached to a linear slide. When the pilot seat is operating in the piloting mode, at least one of translational and rotational movements of each of the first and second rudder pedals are communicated to a flight control system of the aircraft.

In some embodiments, the leg rest includes a first leg rest portion for accommodating a first leg, a second leg rest portion for accommodating a second leg, and a third leg rest portion configured to hold a life vest, wherein each of the first, second, and third leg rest portions are individually position adjustable.

In some embodiments, the pilot seat is configured with seat recline functionality, and the control system is further configured to enable minimum seat recline functionality when the pilot seat is operating in the piloting mode, and enable maximum seat recline functionality when the pilot seat is operating in the rest mode.

In some embodiments, the maximum seat recline functionality is capable of meeting rest requirements for at least a class II seat.

In some embodiments, the pilot seat further comprises an actuation system configured to adjust a position of the dual function component, the control system is communicatively coupled to the actuation system, and the control system is further configured to enter the pilot seat into the piloting mode or the rest mode depending on a position of the dual function component.

In some embodiments, the pilot seat includes a frame supporting a seat back, a seat bottom, and the dual function component, and the pilot seat is configured with seat recline functionality wherein movements of the seat back, the seat bottom, and the dual function component are coordinated. In some embodiments, minimum seat recline functionality is enabled when the pilot seat is operating in the piloting mode, wherein minimum seat recline functionality includes limited seat back recline and limited dual function component angular adjustment. In some embodiments, maximum seat recline functionality is enabled when the pilot seat is operating in the rest mode, wherein maximum seat recline functionality includes full seat back recline and full dual function component angular adjustment.

In some embodiments, the seat system further includes a switch for switching the operating mode of the pilot seat between the piloting mode and the rest mode.

In some embodiments, changing the pilot seat operating mode from the rest mode to the piloting mode causes the control system to return the pilot seat to an upright position and subsequently activate the flight controller.

According to another aspect, the present disclosure provides a cockpit layout for a two-pilot aircraft. The cockpit layout includes a first pilot seat and a second pilot seat. Each of the first and second pilot seats are configured to operate in a piloting mode and in a rest mode, and each of the first and second pilot seats include a dual function component configured to function as a flight controller when the pilot seat is operating in the piloting mode and a rest surface when the pilot seat is operating in the rest mode, wherein the piloting mode and the rest mode are mutually exclusive operating modes. Each of the first and second pilot seats includes a control system in electronic communication with the respective pilot seat. The control system is configured to activate the flight controller when the respective pilot seat is operating in the piloting mode, and deactivate the flight controller when the respective pilot seat is operating in the rest mode.

In some embodiments, the control system of each of the first and second pilot seats is communicatively coupled or implemented in a single controller, and wherein when one of the first and second pilot seats is operating in the rest mode the other of the first and second pilot seats is precluded from operating in the rest mode.

In some embodiments, the dual function component is adjustable in each of the piloting mode and the rest mode, however, the dual function component is adjustable to a greater degree when the respective pilot seat is operating in the rest mode as compared to when the respective pilot seat is operating in the piloting mode.

In some embodiments, the dual function component is an adjustable leg rest including integrated first and second rudder pedals each pivotally attached to a linear slide. When the respective pilot seat is operating in the piloting mode, at least one of translational and rotational movements of each of the first and second rudder pedals are communicated to a flight control system of the two-pilot aircraft.

In some embodiments, each of the first and second pilot seats is configured with seat recline functionality, and the respective control system is further configured to enable minimum seat recline functionality when the respective pilot seat is operating in the piloting mode, and enable maximum seat recline functionality when the respective pilot seat is operating in the rest mode.

In some embodiments, the maximum seat recline functionality is capable of meeting rest requirements for at least a class II seat.

In some embodiments, each of the first and second pilot seats further comprises an actuation system configured to adjust a position of the dual function component, the control system is communicatively coupled to the actuation system, and the control system is further configured to enter the respective pilot seat into the piloting mode or the rest mode depending on a position of the dual function component.

In some embodiments, each of the first and second pilot seats includes a frame supporting a seat back, a seat bottom, and the dual function component. In some embodiments, each of the first and second pilot seats is configured with seat recline functionality wherein movements of the seat back, the seat bottom, and the dual function component are coordinated. In some embodiments, minimum seat recline functionality is enabled when the respective pilot seat is operating in the piloting mode, wherein minimum seat recline functionality includes limited seat back recline and limited dual function component angular adjustment. In some embodiments, maximum seat recline functionality is enabled when the respective pilot seat is operating in the rest mode, wherein maximum seat recline functionality includes full seat back recline and full dual function component angular adjustment.

In some embodiments, each is the first and second pilot seats is communicatively coupled to a switch operable for switching between the piloting mode and the rest mode of the respective pilot seat.

In some embodiments, for each of the first and second pilot seats, changing the pilot seat operation from the rest mode to the piloting mode causes the respective control system to return the respective pilot seat to an upright position and subsequently activate the flight controller of the respective pilot seat.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
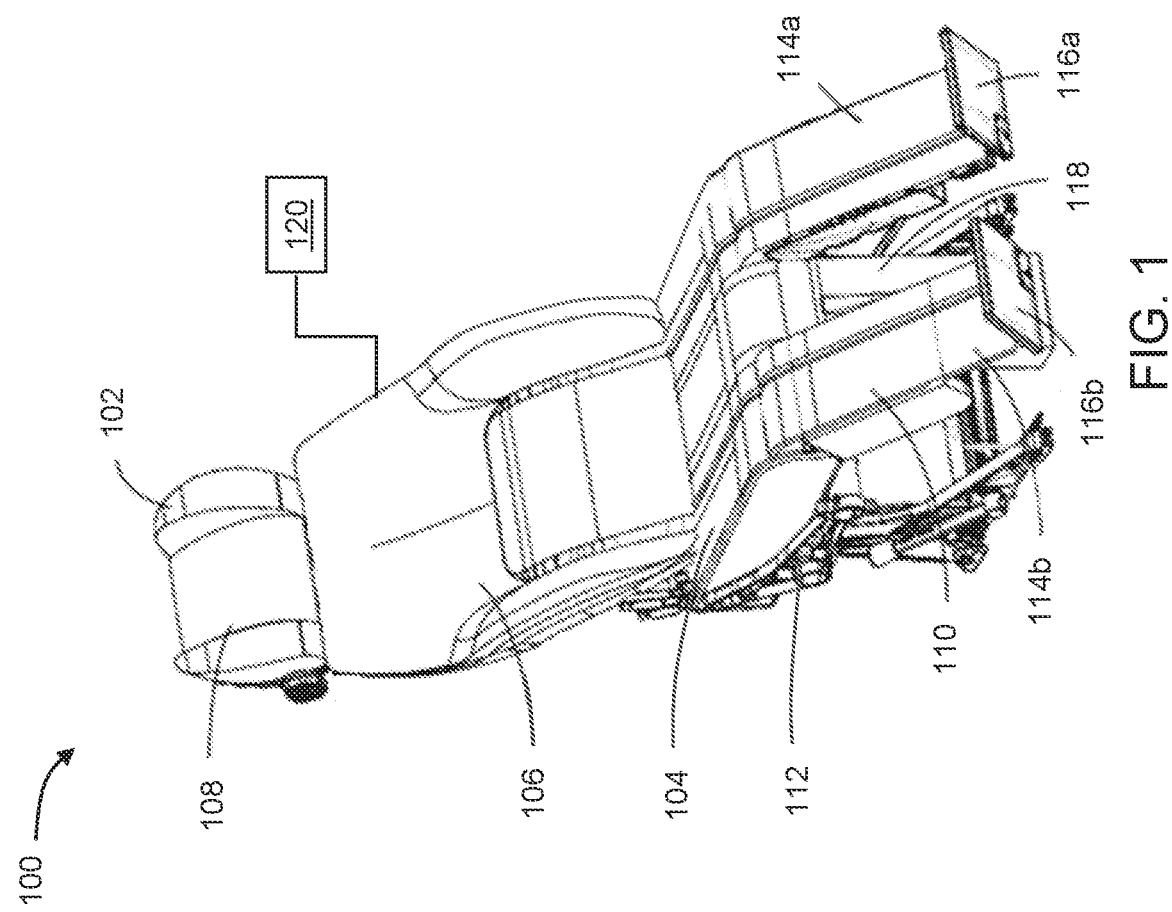
FIG. 1 is a schematic illustration of a system including a pilot seat configured to operate in mutually exclusive piloting and rest modes, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to provisions for pilot rest in an aircraft cockpit. In a particular implementation, the present disclosure provides provisions for pilot rest in a two-pilot aircraft cockpit. Each pilot seat according to the present disclosure may be equipped with a dual function component, such that the pilot seat is configured to operate in two mutually exclusive operating modes. In the first operating mode corresponding to a piloting mode, the dual function component functions as a flight control/controller. In the second operating mode, the dual function component functions as a rest support. In other words, the flight control aspect of the dual function component is activated during piloting mode and deactivated during rest mode.

In a particular embodiment, the dual function component is implemented as a leg rest including integrated rudder pedals. When operating the pilot seat in piloting mode, the rudder controls are activated in order to control a flight aspect of the aircraft. When operating the pilot seat in rest mode, the rudder controls are deactivated to function as foot and leg supports. The pilot seat is configured to adjust between an upright position and a resting position (e.g., sleeping position) through at least one intermediate position. When operating in piloting mode, the pilot seat is in the upright position or substantially upright position with limited adjustment capability (e.g., adjustment to achieve an ergonomic sitting position for piloting the aircraft). When operating in rest mode, the pilot seat may be adjusted to a comfortable resting position (e.g., lie flat or substantially lie flat sleeping position) in which at least one support surface is reclined, raised, extended, adjusted toward horizontal, etc. In some embodiments, entering the pilot seat into rest mode automatically deactivates the flight control aspect of the rudder pedals.

FIG. 1 illustrates a pilot rest system 100 according to an embodiment of the present disclosure. The system 100 includes at least one pilot seat 102 configured to operate in a piloting mode or in a rest mode, wherein the two modes are mutually exclusive operating modes. The pilot seat 102 includes seat support surfaces such as a seat bottom 104, a seat back 106, a head rest 108, and a lower leg and foot rest assembly 110, each of which may be supported by a seat frame 112 configured to be affixed to the floor. The pilot seat 102 may be capable of vertical and/or horizontal adjustment, via conventional mechanisms, to position the pilot in an ergonomic and comfortable position relative to the flight controls. In some embodiments, the conventional adjustment mechanisms operate separately and independently of the seat operating modes. Each of the support surfaces provides support to the pilot and may be independently adjustable or grouped for coordinated adjustments.

At least one of the support surfaces is a dual function component configured to provide a different function in each of the piloting and rest operating modes. In other words, the dual function component serves a first function when the pilot seat 102 is operating in piloting mode, and a second different function when the pilot seat 102 is operating in rest mode. In some embodiments, a function of the dual function component is enabled or activated when the pilot seat 102 is operating in piloting mode, and disabled or deactivated when the pilot seat 102 is operating in rest mode. In the case of flight controls of the dual function component, they may be enabled when the pilot seat 102 is operating in piloting mode and disabled when the pilot seat 102 is operating in rest mode. In some embodiments, the component may provide two functions, wherein a first function is enabled in each of the piloting and rest operating modes, and the second function is enabled only during piloting mode.

As shown in FIG. 1, the dual function component may be implemented as the lower leg and foot assembly 110. In use, the assembly 110 is configured to function as a flight controller when the pilot seat 102 is operating in piloting mode, and as a rest surface for the lower legs and feet when the pilot seat 102 is operating in rest mode. While the assembly 110 may provide support to the lower legs and feet in both operating modes, rest surface functionality as used herein means the primary function of the assembly 110 as a fully adjustable lower leg and foot support.

In embodiments, the assembly 110 generally includes first and second lower leg support members 114a, 114b each including a respective integrated rudder pedal 116a, 116b. Each rudder pedal 116a, 116b is associated with an adjustable portion of the assembly 110, for instance the first and second lower leg support members 114a, 114b that correspond to left and right leg portions. The assembly 10 may further include a middle section 118 positioned between the first and second lower leg support members 114a, 114b. In some embodiments, the middle section 118 defines an interior compartment configured to hold a life vest. In some embodiments, the middle section 118 is fixed and each of the first and second lower leg support members 114a, 114b adjust in at least one of length and angle relative to the middle section 118. In some embodiments, each of the first and second lower leg support members 114a, 114b and the middle section 118 are independently adjustable. In other embodiments, movements of one or more of the first and second lower leg support members 114a, 114b and the middle section 118 may be grouped and coordinated. As discussed below, the pilot rest system 100 further includes a controller 120 configured to enter the pilot seat 102 into the different operating modes thereby activating or deactivating certain functionalities of the dual function component.

Figure 2:
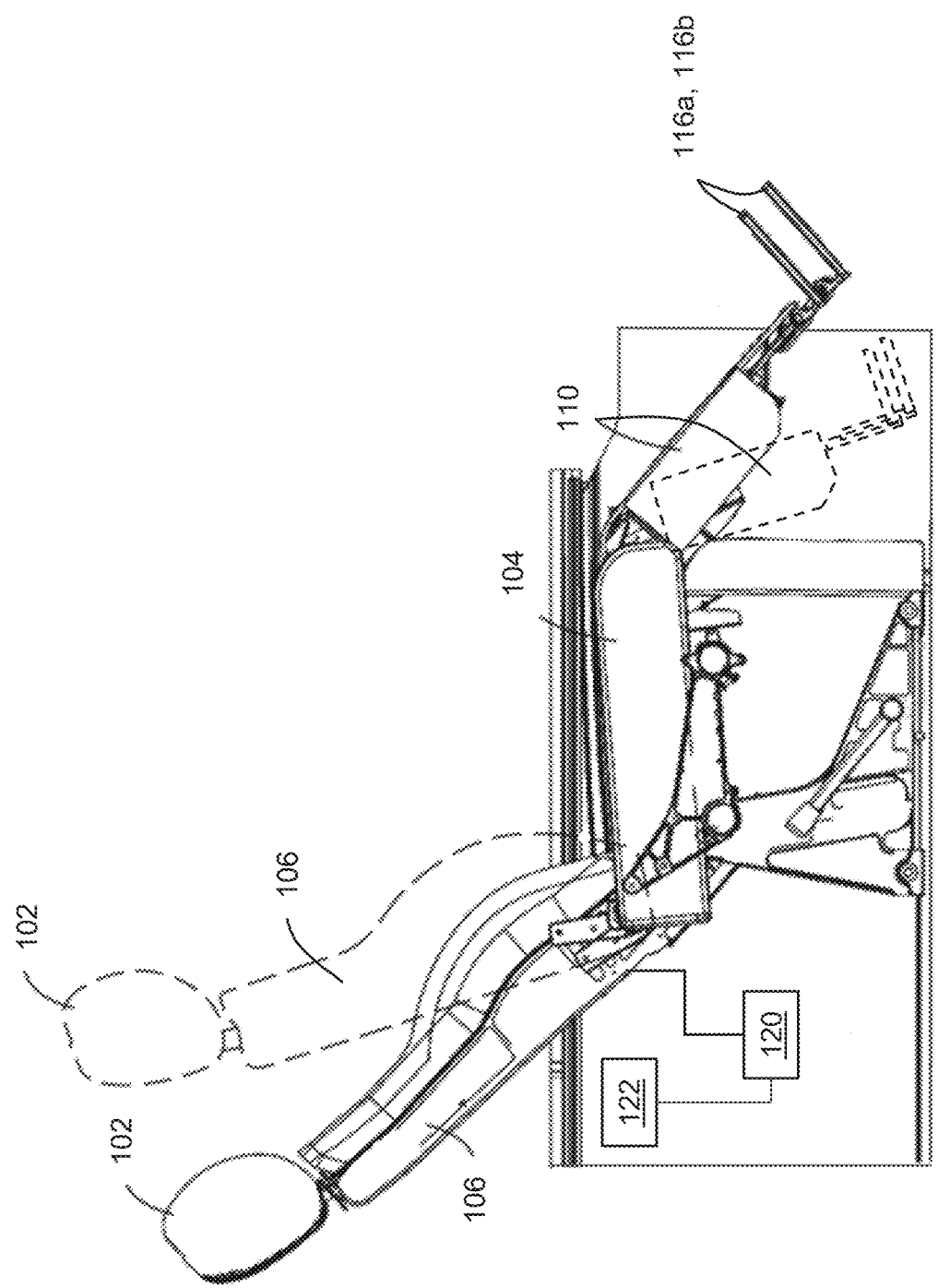
FIG. 2 is a side view of the pilot seat of FIG. 1, showing seat positions in the piloting and rest operating modes, in accordance with example embodiments of this disclosure.

FIG. 2 illustrates pilot seat 102 sitting positions in each of the piloting and rest operating modes. When operating in piloting mode, the seat bottom 104, seat back 106, and assembly 110 are positioned to form an upright sitting position suitable for effectively piloting the aircraft. When operating in rest mode, the seat bottom 104, seat back 106, and assembly 110 transition to form a deep seat back recline and elevated lower leg position. In some embodiments, the fully reclined state of the pilot seat 102 in rest mode may form a substantially horizontal bed (i.e., lie-flat). Rotational, translational and extension movements of the various seat components may be achieved using various seat actuators.

When operating in piloting mode, at least one of translational and rotational movement of the first and second rudder pedals 116a, 116b are communicated to a flight control system of the aircraft. The communication may be via a mechanical linkage, fly-by-wire system, combination of both, etc. The controller 120, which is in electronic communication with the pilot seat 102, is configured to activate the rudder pedals 116a, 116b when the pilot seat 102 is operating in piloting mode, and deactivate the rudder pedals 116a, 116b when the pilot seat 102 is operating in rest mode. In some embodiments, the controller 120 is further configured to allow minimum seat recline functionality when the pilot seat 102 is operating in piloting mode, and allow maximum seat recline functionality when the pilot seat 102 is operating in rest mode. In some embodiments, maximum seat recline in the rest mode is capable of meeting rest requirements for at least a Class II seat.

In embodiments, the pilot seat 102 includes an actuation system configured to adjust a position of the assembly 110. The controller 120 may be communicatively and electrically coupled to the actuation system. The controller 120 may be further configured to enter the pilot seat 102 into piloting mode or rest mode depending on the position of the assembly 110. The controller 120 may be configured to allow minimum seat adjustment functionality when the pilot seat 102 is operating in piloting mode, for instance limited seat back 106 recline and assembly 110 length and/or angular adjustment. The controller 120 may be further configured to allow maximum seat recline functionality when the pilot seat 102 is operating in rest mode, wherein maximum seat recline functionality includes full seat back 106 recline and full assembly 110 angular adjustment toward horizontal. In addition, the seat bottom 104 may be configured to translate and/or rotate with coordinated movements of the seat back 106 and the assembly 110.

In some embodiments, the system 100 includes a switch 122, for example provided in a control panel, for selecting between the piloting and rest operating modes. In use, entering the pilot seat 102 into piloting mode from rest mode causes the controller 120 to return the seat to the upright sitting position and activate the flight control function of the rudder pedals 116a, 116b, simultaneously with seat movement and/or at the completion of the seat adjustment to the upright sitting position. Conversely, entering the pilot seat 102 into rest mode from piloting mode causes the controller 120 to deactivate the flight control function of the rudder pedals 116a, 116b. Thus, when operating the pilot seat 102 in rest mode, movements of the lower leg sections 114a, 114b and rudder pedals 116a, 116b do not affect any flight control, but instead merely serve as adjustable rest surfaces for the lower legs and feet of the pilot.

Figure 3:
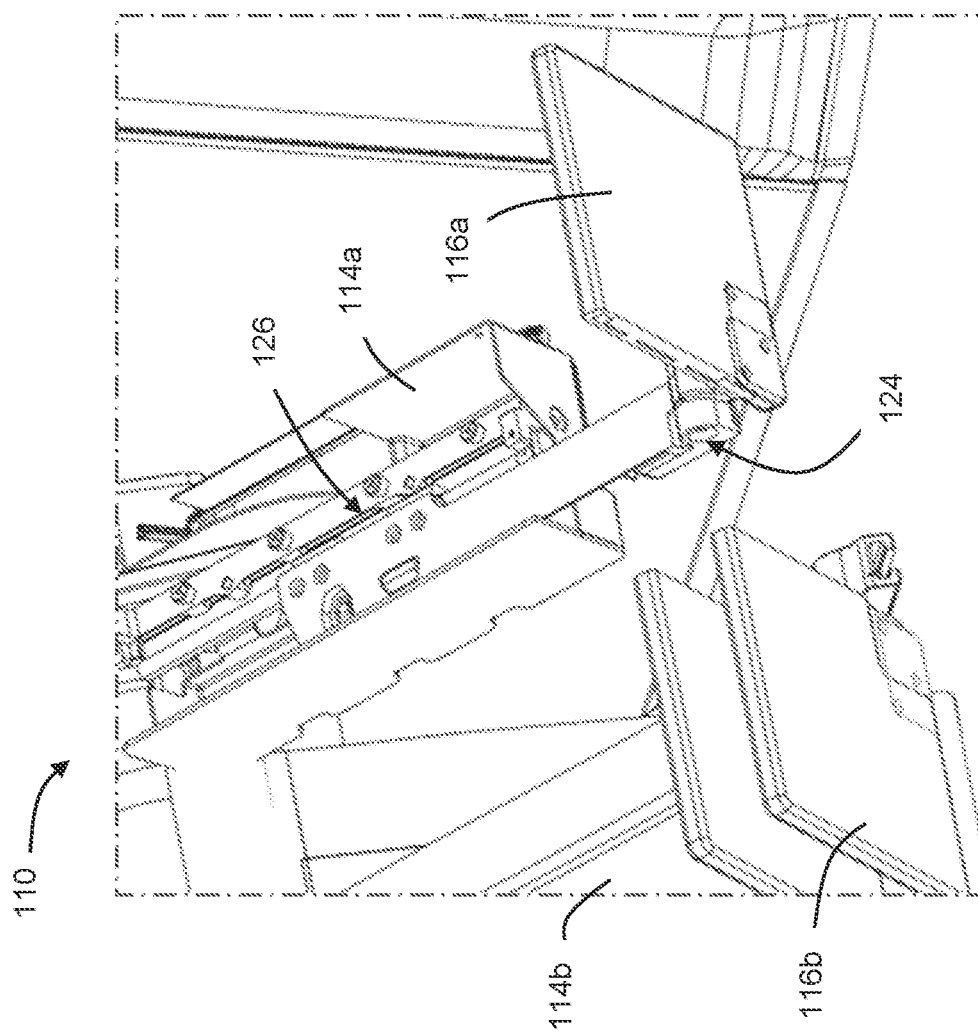
FIG. 3 illustrates a dual function seat component implemented as a leg and foot rest, in accordance with example embodiments of this disclosure.
Figure 4:
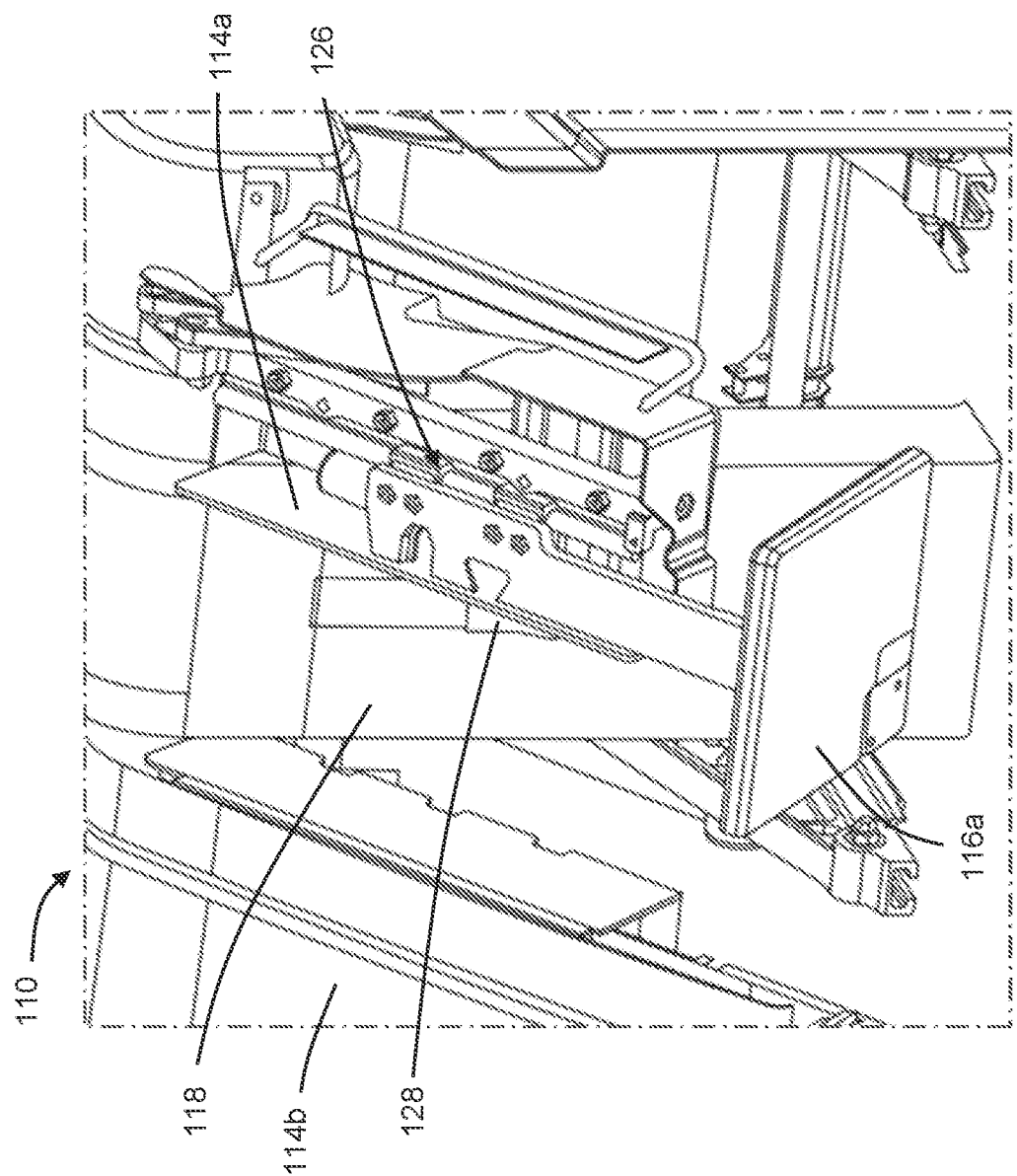
FIG. 4 illustrates movement mechanisms of the leg and foot rest for flight control, in accordance with example embodiments of this disclosure.

FIGS. 3 and 4 illustrate an embodiment of the lower leg and foot rest assembly 110. When operating in pilot mode, rudder pedals 116a, 116b may function to actuate the aircraft rudder to control flight attitude. In some embodiments, the rudder pedals 116a, 116b may also provide an aircraft braking function. The rudder pedals 116a, 116b may be interconnected via linkage such that they move in opposite directions. The rudder pedals 116a, 116b may be further pivotally connected at pivot points 124. In some embodiments, the rudder pedals 116a, 116b may be coupled to a fly-by-wire system including an electronic interface such that movements of the rudder pedals 116a, 116b are converted to electrical signals transmitted by wires and the controller 120, such as a flight control computer, determines actuator movement to elicit the intended response. In some embodiments, the rudder pedals 116a, 116b may be attached to linear slide mechanisms 126 such that the rudder pedals 116a, 116b are configured to both translate relative to their respective lower leg support member 114a, 114b, as well as rotate relative to their respective linear slide mechanism 126.

As shown in FIG. 4, the middle section 118 of the assembly 110 may remain stationary and affixed to the floor. In embodiments, a compartment in the middle section 118 forms an interior space for stowing items such as a life vest. The compartment may be accessed by actuating a latch 128 positioned on a front side of the middle section 118. In use, each of the first and second lower leg support sections 114a, 114b may be independently adjustable or their movements linked such that they rotate together.

Figure 5:
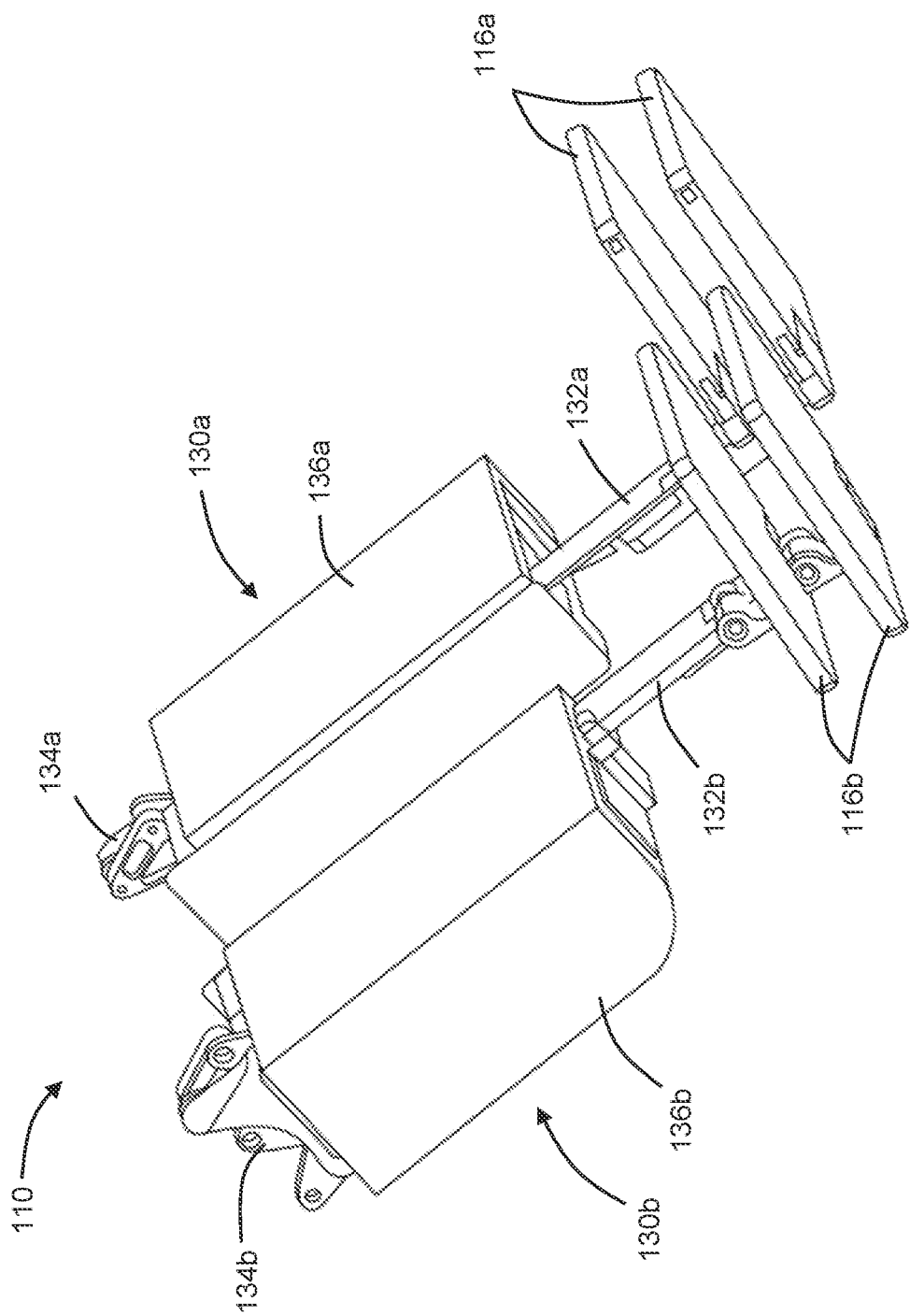
FIG. 5 illustrates a leg rest assembly with integrated flight controls, in accordance with example embodiments of this disclosure.

FIG. 5 illustrates a portion of the lower leg and foot rest assembly 110 operable for flight control. The assembly 110 includes a pair of subassemblies 130a, 130b each including their respective rudder pedal 116a, 116b. Each rudder pedal 116a, 116b is pivotally attached to a translating frame member 132a, 132b. Each subassembly 130a, 130b may include one or more of drive links, driven links, rotating joints, etc. to provide one or more of linear and rotating travel paths for the rudder pedals 116a, 116b. Each subassembly 130a, 130b may include, at their end opposite the rudder pedals 116a, 116b, a coupler link 134a, 134b for attaching the subassemblies to the seat frame. Slide mechanisms associated with the translating frame members 132a, 132b may be packaged and protected beneath metal coverings 136a, 136b that provide a foundation for the lower leg support padding. The assembly 110 may be cushioned and upholstered.

Figure 6:
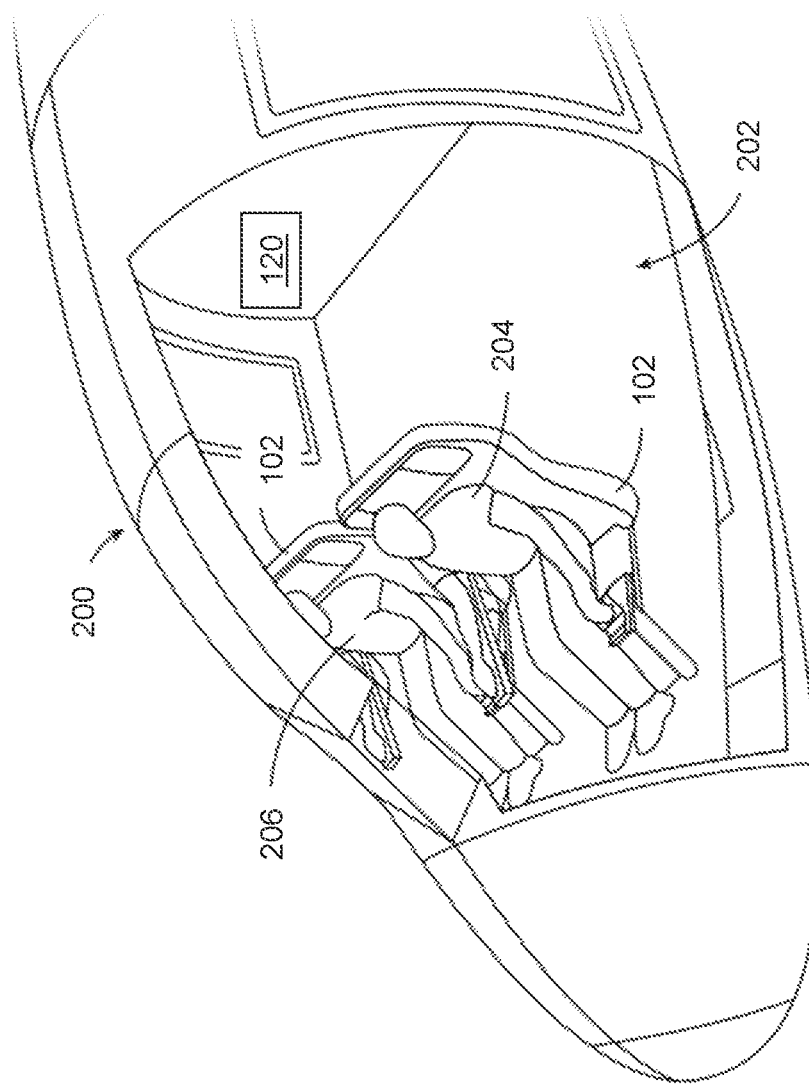
FIG. 6 illustrates an aircraft cockpit with pilot seats configured with mutually exclusive piloting and rest modes, in accordance with example embodiments of this disclosure.

FIG. 6 illustrates application of the pilot seat system in an aircraft 200, and specifically application in a two-pilot aircraft cockpit 202. The cockpit 202 includes first and second pilot seats 102, as discussed above, for accommodating a pilot 204 and co-pilot 206. Each pilot seat 102 is configured to operate in mutually exclusive piloting and rest modes. Each pilot seat 102 is communicatively coupled to a controller 120, for instance a singular controller configured to activate the flight controller of at least one of the pilot seats operating in the piloting mode, and deactivate the flight controller when the pilot seats are operating in the rest mode.

Redundancy in the flight instruments and controls of the system permit either pilot to control the aircraft. By convention, the left-side pilot seat 102 is typically assigned to a flight captain and the right-side pilot seat 102 is typically assigned to a first officer. As a flight proceeds, the roles the two onboard pilots assume may be exchanged and shared as they cooperatively control the aircraft. During normal flight operation, a first pilot occupies one pilot seat 102 and a second pilot 102 occupies the second pilot seat 102. The two pilots cooperatively control the aircraft in this mode. The distance and corresponding duration of the flight may exceed comfort or regulatory limits of the pilots, and rest may be needed accordingly. The maximum flight time for a pilot during a day is limited by regulation in some aeronautical jurisdictions, for example to nine hours, and eight hours at night. Flight duty period limits, accumulating both rest and alert times, can be higher, for example ranging from nine to fourteen hours, depending on how many segments are flown and the start time of the pilot's duty day.

To provide a rest period for a pilot, the pilot seats 102 according to these descriptions recline, for example through a range of reclined positions from their upright positions for use by alert pilots to fully reclined or lie flat positions to attain true sleep. As discussed above, the seat back may be rotated lower from its upright position, and the leg and foot rest assembly may be pivotally raised. Again, the seat bottom may articulate with movements of the seat back. In the fully reclined condition, the seat back may be at or near horizontal, approximately aligned with the seat bottom, and the leg rest 110 is pivotally raised.

The flight crew member on one pilot seat 102 may be resting to comply with maximum flight time limits set by aeronautical authorities, or airline operators, or, the crew member may be resting by personal choice. The reclining pilot seats 102 achieve their fully reclined positions in a space within the dimensions of the cockpit.

Figure 7:
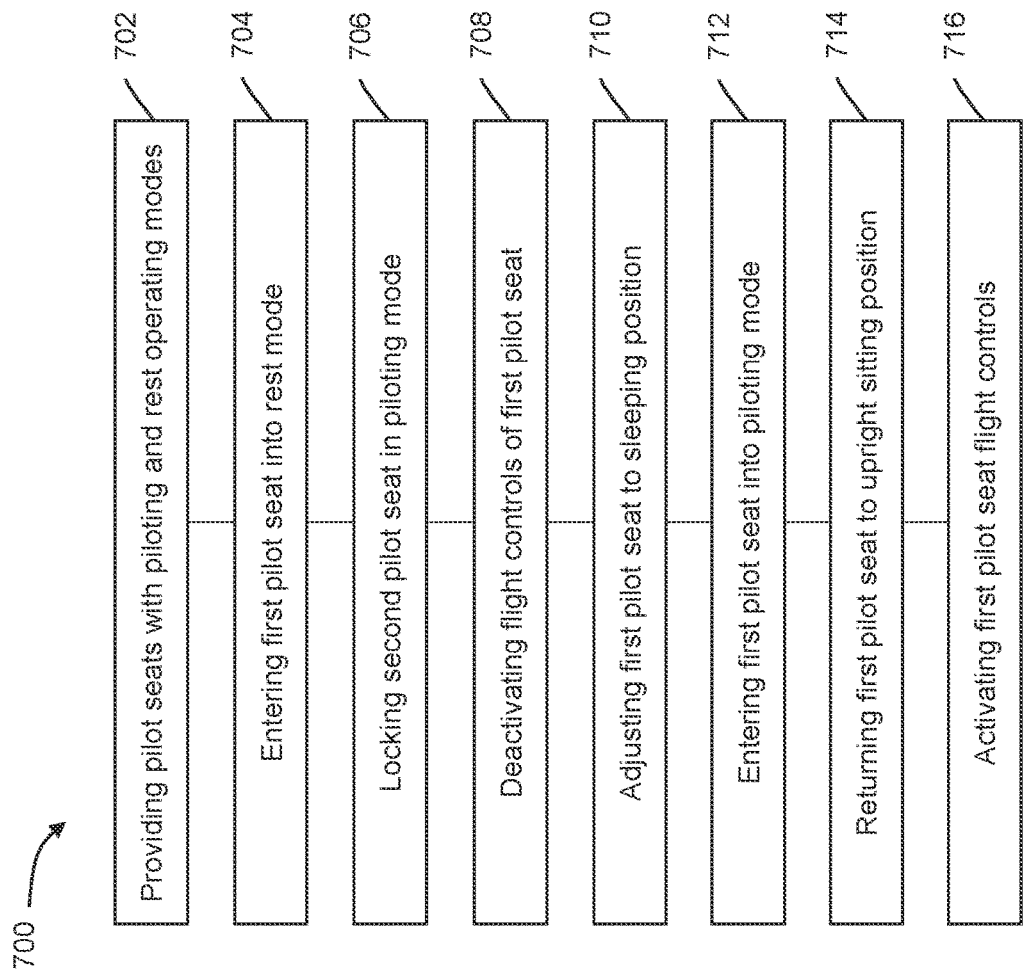
FIG. 7 is a flow diagram illustrating a method of pilot rest in an aircraft cockpit, in accordance with example embodiments of this disclosure.

FIG. 7 illustrates an example implementation of a method 700 that employs the pilot rest system described herein. In general, operations of disclosed processes (e.g., method) may be performed in an arbitrary order, unless otherwise provided in the claims. The method may further include any step or operation implied or required by the embodiments of the pilot rest system described herein. The pilot rest system can also include any additional component or functionality expressed or implied by the method.

At step 702, the method includes providing first and second pilot seats in an aircraft cockpit. Each of the first and second pilot seats is configured to operate in mutually exclusive piloting and rest operating modes. During normal flight operation, both pilot seats operate in piloting mode. At step 704, the method includes entering the first pilot seat into rest mode. At step 706, the method includes locking the second pilot seat in piloting mode (i.e., rest mode lockout function). At step 708, the method includes deactivating the flight controls of the first pilot seat now entered into rest mode. At step 710, the method includes adjusting the first pilot seat to any desirable rest position. At step 712, the method includes entering the first pilot seat back into piloting mode. At step 714, the method includes retuning the first pilot seat to the upright or piloting sitting position. At step 716, the method includes activating the first pilot seat flight controls such that the first pilot can resume piloting function. When both pilot seats are operating in piloting mode, either one of the pilot seats can be entered into rest mode.

The controller 120 described herein may be configured to select, enter, determine, activate, deactivate, adjust, etc. The controller 120 may include at least one processor, memory, and a communication interface. The processor provides processing functionality for at least the controller 120 and may include any number of processors, micro-controllers, circuitry, field programmable gate array (FPGA) or other processing systems, and resident or external memory for storing data, executable code, and other information accessed or generated by the controller. The processor may execute one or more software programs embodied in a non-transitory computer readable medium (e.g., memory) that implements techniques described herein. The processor is not limited by the materials from which it is formed, or the processing mechanisms employed therein and, as such, can be implemented via semiconductor(s) and/or transistors (e.g., using electronic integrated circuit (IC) components), and so forth.

The memory may be an example of tangible, computer-readable storage medium that provides storage functionality to store various data and/or program code associated with operation of the controller/processor, such as software programs and/or code segments, or other data to instruct the processor, and possibly other components of the controller, to perform the functionality described herein. Thus, the memory can store data, such as a program of instructions for operating the controller, including its components (e.g., processor, communication interface, etc.), and so forth. It should be noted that while a single memory is described, a wide variety of types and combinations of memory (e.g., tangible, non-transitory memory) may be employed. The memory may be integral with the processor, may comprise stand-alone memory, or may be a combination of both. Some examples of the memory may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

A communication interface may be operatively configured to communicate with components of the controller 120. For example, the communication interface may be configured to retrieve data from the processor or other devices, transmit data for storage in the memory, retrieve data from storage in the memory, and so forth. The communication interface may also be communicatively coupled with the processor to facilitate data transfer between components of the controller 120 and the processor. It should be noted that while the communication interface is described as a component of the controller 120, one or more components of the communication interface may be implemented as external components communicatively coupled to the controller via a wired and/or wireless connection. The controller 120 may also include and/or connect to one or more input/output (I/O) devices (e.g., human machine interface (HMI) devices) via the communication interface. In embodiments, the communication interface may include a transmitter, receiver, transceiver, physical connection interface, or any combination thereof.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A pilot seat, comprising:
  a frame;
  a seat bottom mounted to the frame;
  a seat back mounted to the frame;
  a lower leg and foot rest assembly mounted to the frame, the lower leg and foot rest assembly comprising:
    a first subassembly including a first lower leg support and a first rudder pedal pivotally mounted to a first linear slide; and
    a second subassembly including a second lower leg support and a second rudder pedal pivotally mounted to a second linear slide;
    wherein the first and second subassemblies are independently adjustable; and
  a controller configured to operate the pilot seat in a piloting mode and a rest mode, wherein the piloting mode and the rest mode are mutually exclusive operating modes of the pilot seat, and wherein:
    when the pilot seat is operating in the piloting mode, the first and second subassemblies are operable as flight controllers; and
    when the pilot seat is operating in the rest mode, the first and second subassemblies are inoperable as flight controllers.

2. The pilot seat according to claim 1, wherein the first and second subassemblies are position adjustable in each of the piloting mode and the rest mode, and wherein the first and second subassemblies are position adjustable to a greater extent when the pilot seat is operating in the rest mode and compared to when the pilot seat is operating in the piloting mode.

3. The pilot seat according to claim 1, wherein, when the pilot seat is operating in the piloting mode, at least one of translational and rotational movements of the first and second rudder pedals are configured to be communicated to a flight control system of an aircraft.

4. The pilot seat according to claim 1, wherein the lower leg and foot rest assembly further comprises a fixed middle portion positioned between the first and second subassemblies.

5. The pilot seat according to claim 1, wherein the controller is further configured to enable minimum seat recline functionality when the pilot seat is operating in the piloting mode, and enable maximum seat recline functionality when the pilot seat is operating in the rest mode.

6. A cockpit layout for a two-pilot aircraft, comprising:
first and second pilot seats each comprising:
  a frame;
  a seat bottom mounted to the frame;
  a seat back mounted to the frame;
  a lower leg and foot rest assembly mounted to the frame, the lower leg and foot rest assembly comprising:
    a first subassembly including a first lower leg support and a first rudder pedal pivotally mounted to a first linear slide; and
    a second subassembly including a second lower leg support and a second rudder pedal pivotally mounted to a second linear slide;
    wherein the first and second subassemblies are independently adjustable; and
a controller configured to operate the first and second pilot seats in a piloting mode and a rest mode, wherein the piloting mode and the rest mode are mutually exclusive operating modes of the first and second pilot seats, and wherein:
  when the first and second pilot seats are operating in their respective piloting mode, the first and second subassemblies are operable as flight controllers;
  when the first and second pilot seats are operating in their respective rest mode, the first and second subassemblies are inoperable as flight controllers; and
  when one of the first and second pilot seats is operating in the rest mode the other of the first and second pilot seats is precluded from operating in the rest mode.

7. The cockpit layout according to claim 6, wherein the first and second subassemblies are position adjustable in each of the piloting mode and the rest mode, and wherein the first and second subassemblies are position adjustable to a greater extent when the pilot seat is operating in the rest mode and compared to when the pilot seat is operating in the piloting mode.

8. The cockpit layout according to claim 6, wherein, when the first and second pilot seats are operating in their respective piloting mode, at least one of translational and rotational movements of the first and second rudder pedals are configured to be communicated to a flight control system of an aircraft.

9. The cockpit layout according to claim 6, wherein the lower leg and foot rest assembly further comprises a fixed middle portion positioned between the first and second subassemblies.

10. The cockpit layout according to claim 6, wherein the controller is further configured to enable minimum seat recline functionality when the first and second pilot seats are operating in their piloting mode, and enable maximum seat recline functionality when the first and second pilot seats are operating in their respective rest mode.

* * * * *